United States Patent
Aseev et al.

(10) Patent No.: US 11,997,162 B1
(45) Date of Patent: May 28, 2024

(54) SYSTEMS AND METHODS OF EXPOSING DATA FROM BLOCKCHAIN NODES

(71) Applicant: Chainstack Pte. Ltd, Singapore (SG)

(72) Inventors: Evgeny Aseev, Singapore (SG); Laurent Dedenis, Singapore (SG); Dmitry Chepurovskiy, Limassol (CY); Anton Zaslavskii, Tel Aviv (IL); Serg Bell, Singapore (SG); Stanislav Protasov, Singapore (SG)

(73) Assignee: Chainstack Pte. Ltd, Singapore (SG)

( * ) Notice: Subject to any disclaimer, the term of this patent is extended or adjusted under 35 U.S.C. 154(b) by 0 days.

(21) Appl. No.: 18/054,540

(22) Filed: Nov. 11, 2022

(51) Int. Cl.
- *G06F 15/16* (2006.01)
- *H04L 67/1008* (2022.01)
- *H04L 67/104* (2022.01)
- *H04L 67/561* (2022.01)

(52) U.S. Cl.
CPC ........ *H04L 67/1008* (2013.01); *H04L 67/104* (2013.01); *H04L 67/561* (2022.05)

(58) Field of Classification Search
None
See application file for complete search history.

(56) References Cited

U.S. PATENT DOCUMENTS

| | | | |
|---|---|---|---|
| 10,871,948 B1 * | 12/2020 | Dowling | G06Q 20/02 |
| 2020/0358784 A1 * | 11/2020 | Khaund | G06F 9/468 |
| 2022/0417044 A1 * | 12/2022 | Goel | G06F 11/1464 |

* cited by examiner

Primary Examiner — Wing F Chan
Assistant Examiner — Andrew Woo
(74) *Attorney, Agent, or Firm* — Christian J. Girtz

(57) ABSTRACT

The present disclosure relates to a system and method for exposing data from blockchain nodes and orchestrating requests to blockchain nodes. The system mainly includes a client application, a load balancer, and blockchain nodes connected to the blockchain network. The system receives a request from the client application. The load balancer is configured with an upstream selection logic and configured with custom metadata specific to blockchain nodes. Based upon the upstream selection logic, the load balancer generates a proxy request to the selected blockchain node. The load balancer of the system is a general-purpose load balancer having built-in plugins, such as an authentication service unit and a tracking unit. Based on the selection logic and the upstream metadata, the general-purpose load balancer is extended with custom plugins.

10 Claims, 4 Drawing Sheets

SYSTEMS AND METHODS OF EXPOSING DATA FROM BLOCKCHAIN NODES

FIELD OF THE INVENTION

The present disclosure generally relates to blockchain technology. In particular the present disclosure relates to a system and methods of exposing data from blockchain nodes using general purpose load balancer.

BACKGROUND OF THE INVENTION

A blockchain, in general terms, is a chain of data blocks that are linked together through hashes of previous blocks. The data stored in an intermediate block is often immutable, thus offering advantages over conventional centralized database systems. Various industries are actively exploring the implementation of their own services in blockchain networks, including financial institutions, government agencies, traditional enterprises, internet companies, and the like.

Particularly, the blockchain is a distributed database incorporating a number of blocks where each block contains data or programs and holds a valid "transaction" that is timestamped. A transaction is typically a discrete operation that makes up, or is a part of, an information processing action. Each block in a blockchain also includes a link to a previous block in the blockchain thus creating a public distributed storage ledger, such as a log or a historical record of transactions. A robust distributed storage ledger structure, such as a blockchain ledger structure, due to its public nature, redundant verification, and resistance to fraudulent activity, offers advantages over existing centralized server systems.

However, blockchain technology has a high technical threshold, and the architecture of the blockchain network is complex even for those with a background in similar technology. In general, traditional blockchain applications require excessive computing resources for querying blockchain data and sending transactions. When the requests are computationally intensive, the performance of the blockchain application will be greatly reduced, which may further result in the non-fulfillment of the request. Many of the blockchain node implementations do not provide a high availability mode, although this is essential for maintenance purposes and outage handling. Therefore, load balancing techniques are implemented to route the requests received from the clients towards the blockchain nodes for efficient traffic management and seamless requests handling.

The load balancer, in common implementations, uses multiple algorithms to route the client application requests towards destination upstreams. Examples of the algorithms include a least-connections algorithm, round robin, and observed-response-time and so on. General-purpose load balancers are equipped with integrated features, such as authentication services and tracking services. With integrated features and open-source platforms for software development, and customized configuration, general-purpose load balancers are proven robust, practical, and convenient to use in other environments. However, general-purpose load balancers, such as Envoy or Nginx, are not effective when the load balancers are used to route traffic to the blockchain nodes.

Blockchain nodes cannot be treated indistinguishably because each node synchronizes and stores data from the blockchain independently. Thus, a load balancer, with general algorithms, communicating with the nodes may result in inconsistent data, as the latest block on each node might be different. The data inconsistencies may require introduction of complicated workarounds and may even lead to inevitable errors that may crash applications and ruin user experience.

Alternatively, blockchain specific load balancers could be used to accurately manage traffic from client applications to blockchain nodes. However, currently existing solutions are not widely supported by the community, not well audited for vulnerabilities, and not extensible enough. Consequently, they are less useful for more complex scenarios widely used in production systems. Those scenarios may include different authentication methods, enhanced traffic observability, billing systems integration and alternative traffic management such as service mesh.

Therefore, there is a need for a method to implement a general-purpose load balancer to accurately route traffic to the blockchain nodes as well as to more traditional web applications.

SUMMARY OF THE INVENTION

The present disclosure generally relates to blockchain technology. The present disclosure relates to a system of exposing data from blockchain nodes, and a method for orchestrating requests to one or more blockchain nodes using general purpose load balancer.

The system mainly includes a client application, a load balancer, and one or more blockchain nodes connected to the same blockchain network. The client application generates a request and load balancer receives the request and routes the request to blockchain nodes. The load balancer is configured with a load balancer plugin that polls metadata having custom data, alternatively referred to as custom metadata, specific to blockchain and an upstream selection logic to optimize selection of a blockchain node for serving the request.

In one implementation, the system is communicatively coupled to one or more client applications to generate a request. The load balancer, according to one implementation, is configured to receive the request and generate a proxy request corresponding to the request originated from the client application. In an example, the load balancer is a general-purpose load balancer, such as Envoy or Nginx, having a set of integrated features, such as an authentication service unit for authenticating the request and a tracking unit for tracking the request.

The load balancer is implemented on an infrastructure layer for routing the client application request to the blockchain nodes. The infrastructure layer is utilized for supporting features, such as traffic management, security, load balancing, and so on. Blockchain specific load balancing can be moved to any infrastructure levels, such as edge-servers and service mesh nodes. A service mesh infrastructure is a dedicated infrastructure layer for facilitating service-to-service communications between services or microservices, using a proxy. In one implementation, blockchain specific load balancing could be implemented with service mesh, which allows fine control over traffic management and effectively distributes the load across the computing units. In another implementation, the load balancer is installed as a standalone gateway on a dedicated computing unit.

According to one implementation, the load balancer is configured with a load balancer plugin that polls metadata specific to a blockchain protocol for orchestrating the request within the set of blockchain nodes. Each block of the blockchain consists of metadata which is typically stored in the block header which is used by the nodes to verify the data in the block.

Load balancing helps in achieving optimal resource utilization, maximizing throughput, minimizing response time, and avoiding overload. According to an implementation, the load balancer is configured with the customized upstream selection logic. Based on application, the upstream selection logic differs and is modified at various instances.

In accordance with one implementation, an authentication service unit is implemented on the system, or is integrated with the load balancer for authenticating the request. Further, the load balancer is integrated with a tracking unit for tracking the request. according to one implementation.

In one implementation, the load balancing unit is configured to return the response received from the identified blockchain node to the client application from which the request was received.

In one implementation, each request is proxied based on the upstream selection logic. The upstream selection logic is based on at least one of the following parameters: node location. state, current block height, synchronization status, node mode, and number of peers.

In one implementation, a periodical poll is conducted on each blockchain node at each load balancing instance. During the periodical polling, each load balancing instance monitors the current state of each blockchain node.

In one implementation, the custom metadata received during the periodical polling is utilized for upstream selection to determine if a specific upstream can fulfill the request. The term 'upstream' used throughout the present disclosure refers to sending data from a client application or local computer to the server or remote host.

In one implementation, the load balancer is further configured to retry the execution of failed requests, and if the request cannot be executed after trying for a predetermined number of times, generate an alert about failure to serve the request and notify the client about the failure.

DETAILED DESCRIPTION

Figure 1:
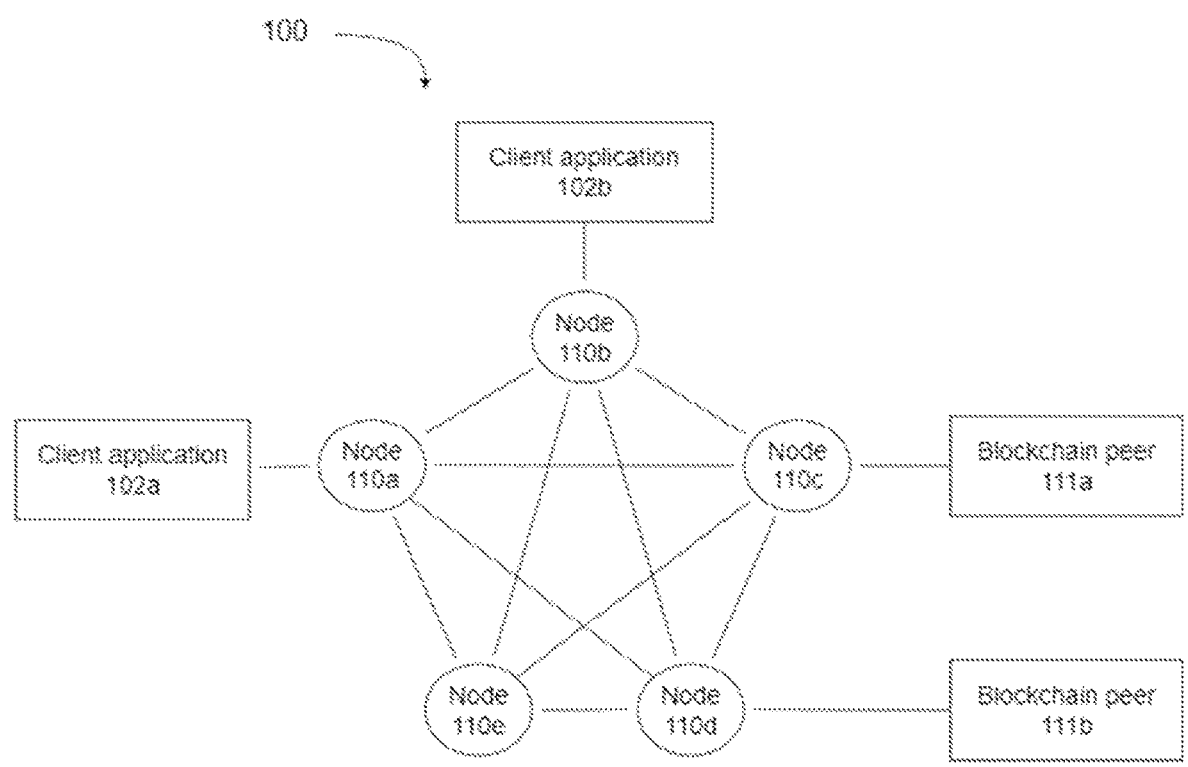
FIG. 1 presents a general blockchain environment for facilitating requests in accordance with one embodiment of the present invention.

The embodiments will now be described more fully hereinafter with reference to the accompanying figures, in which alternative embodiments are shown.

To provide an overall understanding of the systems and methods described herein. certain illustrative embodiments will now be described, including systems and methods for storing trusted data at a cloud storage service. A server or system as used in this description may be a single computing device or multiple computing devices working collectively and in which the storage of data and the execution of functions are spread out amongst the various computing devices.

In an embodiment, a system user logs onto the system to access the blockchain and may be required to be authorized and authenticated to access the system. Accordingly, in some embodiments, the user may be an employee of the entity, such as an administrator.

Data and data files generally refer to data associated with the resource transfer. In particular, the data or data file may contain information needed to complete the resource transfer.

Blockchain refers generally to a distributed electronic ledger of data records which are authenticated by a consensus mechanism. Multiple computing systems within the blockchain, referred to herein as nodes or compute nodes, each comprising a copy of the entire ledger of records. Accordingly, the entire record of transactions is not dependent on a single database which may serve as a single point of failure; the blockchain will persist so long as the nodes on the blockchain persist. Nodes may write a block to the blockchain, where the block may comprise transaction data and metadata, including a reference to the previous block in the chain. In some embodiments, a data record or a transactional record may refer to data associated with a resource transfer which is stored in a block on the blockchain. By linking blocks in this way, the blockchain contains a reliable history of all relevant records of data and resource transfers between entities. In some embodiments, the data may relate to a financial transaction. In other embodiments, the data may be files or records belonging to an individual or entity. The block may further comprise a time stamp and a pointer to the previous block in the chain, where the pointer may be a fixed-length hash generated by a hash algorithm.

The load balancer accepts incoming requests from client applications to a blockchain node. The load balancer chooses the destination blockchain node and routes the request received from the client application to it. For example, the node may be identified by one or more of a destination network address, a protocol, a destination port number, and so forth. In an Internet Protocol (IP) networking environment, the destination node may be identified by a destination IP address, an indication of a transport layer protocol (such as Transport Control Protocol (TCP), User Datagram Protocol (UDP), and a port number. In one example, the port number may be a TCP port number, such as the "well-known" TCP port number 80, which indicates that the request is a Hypertext Transfer Protocol (HTTP) request. In this example, the client request may include an HTTP request to establish an HTTP connection to a web server. But other TCP or UDP ports may be used to identify the node without departing from the scope of embodiments. In addition, the destination node may be identified based on some other protocol, such as HTTP, Real Time Protocol (RTP), and so forth. Other protocol suites, besides IP networking, may also be used without departing from the scope of embodiments.

Although the various computing systems herein are depicted as single units, each of the depicted computing systems may represent multiple computing systems. In some embodiments, a given computing system may represent multiple systems configured to operate in a distributed fashion. In other embodiments, the functions of multiple computing systems may be accomplished by a single system.

FIG. 1 presents a general blockchain environment 100 for facilitating requests, in accordance with one embodiment of the present invention. The blockchain environment 100 typically comprises a plurality of nodes 110 (e.g. nodes 110*a-e*), each of which are connected to one another over a network, and each of which comprises a complete copy of the blockchain. The network may also be a global area network (GAN), such as the Internet, a wide area network (WAN), a local area network (LAN), or any other type of network or combination of networks. The network may provide for wireline, wireless, or a combination wireline and wireless communication between devices on the network. Moreover, the nodes are usually connected to other nodes in a global area network, also referred to as blockchain peers 111 (e.g. blockchain peers 111a-b). The nodes maintain the blockchain and add new blocks to the blockchain via a consensus algorithm; that is, the addition of data records to the blockchain may occur only through consensus. Typically, consensus is reached when a threshold number of nodes have voted to validate the pending data record. Once the pending data record has been validated, the pending data record may be appended to the blockchain and become immutable. Each node may thereafter update its copy of the blockchain accordingly to ensure consistency of records amongst the nodes.

In some embodiments, each entity may include a client application 102 (e.g. client application 102a-b) connected to a node. One or more of the client applications may request a blockchain mode to write data onto the blockchain or read data from the blockchain.

In one embodiment, the client application 102 of the blockchain environment may include a computing system connected to the Internet. Such a configuration is typically used for computers acting as hosts, connected to the Internet and executing a server or a client (or a combination) software. The computing system may be used as a portable electronic device or fixed-location computing devices, or a combination of these devices, and can include a processor and operably coupled memory.

Figure 2:
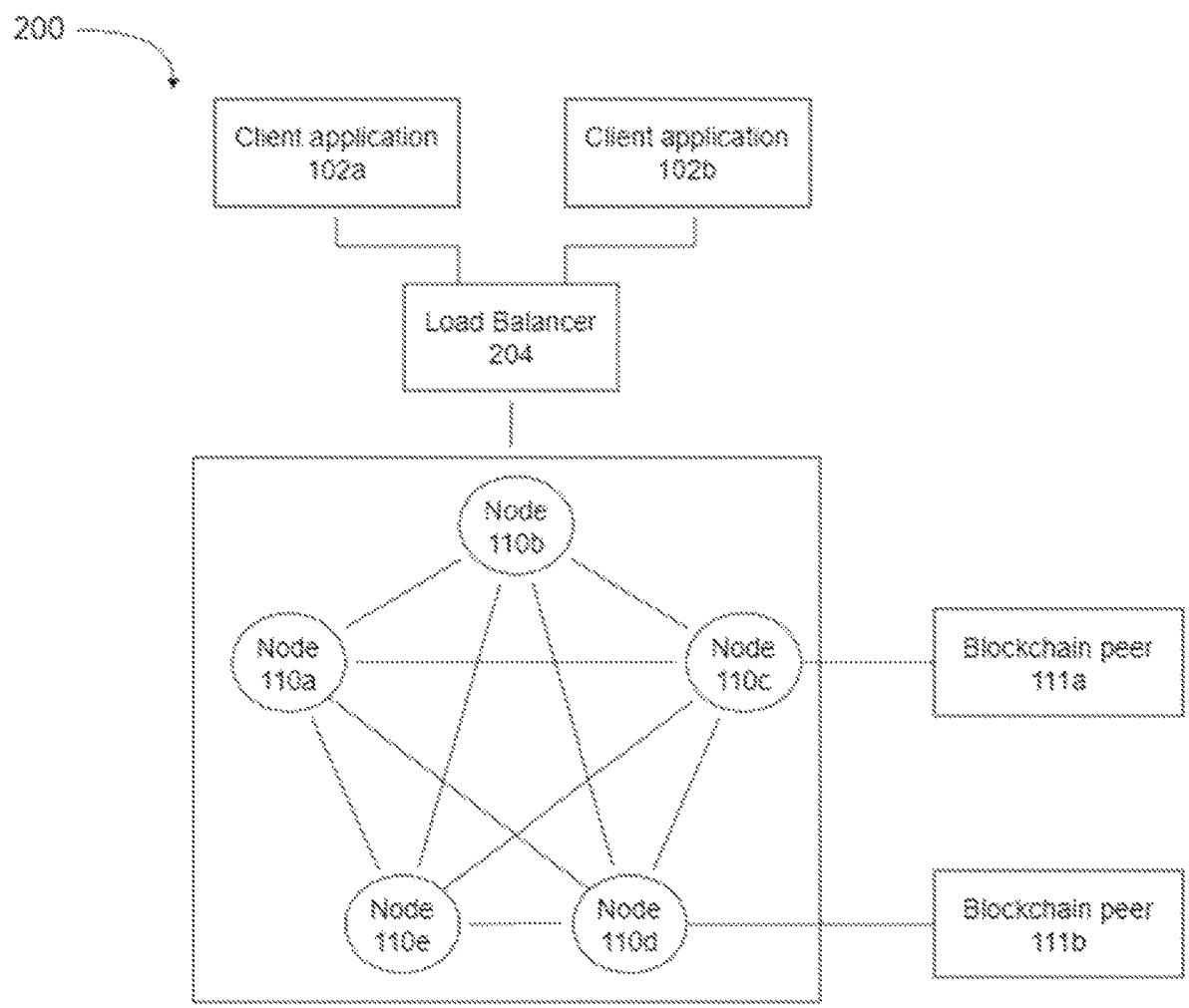
FIG. 2 depicts a load balancing environment, in accordance with one embodiment.

In FIG. 2, a load balancing environment is depicted, in accordance with one embodiment.

FIG. 2 depicts the load balancing environment, where blockchain nodes are communicatively coupled to the client applications 102 and blockchain peers 111. A user is enabled to create a request using the client application 102. The request may be a request from the client application 102 to establish a new flow between the client application 102 and the blockchain node 110. The request, in an example, may be a data read request to read the data stored in one or more blocks of the blockchain, or a data write request to write new data in one or more blocks of the blockchain to name a few. The request is received by the system 200 for identifying the blockchain node 110 to handle the request.

The system 200 is implemented between one or more client applications 102 and the blockchain nodes 110 to manage request traffic. The system 200 is coupled to a plurality of blockchain nodes 110. The blockchain nodes store numerous blocks of data forming a chain of blocks. The length of the node's chain can be less or equal to the length of the global chain of the blockchain network. The system 200 is tasked with load balancing network traffic across the blockchain nodes 110.

The system 200, in one embodiment, may be configured with an upstream selection logic for selecting a blockchain node 110 to handle the request. The selection logic may be based on one or more identifying parameters, such as node location, state, current block height, synchronization status, node mode, number of peers, and the like, for selecting a blockchain node 110 to serve the request. According to one embodiment, the system 200 is configured to monitor the blockchain nodes 110 periodically to collect data pertaining to the identifying parameters corresponding to the blockchain nodes 110. The system 200 selects one blockchain node 110 specifically to cater the requests and sets up a connection, such as a proxy connection, to the blockchain node 110.

Figure 3:
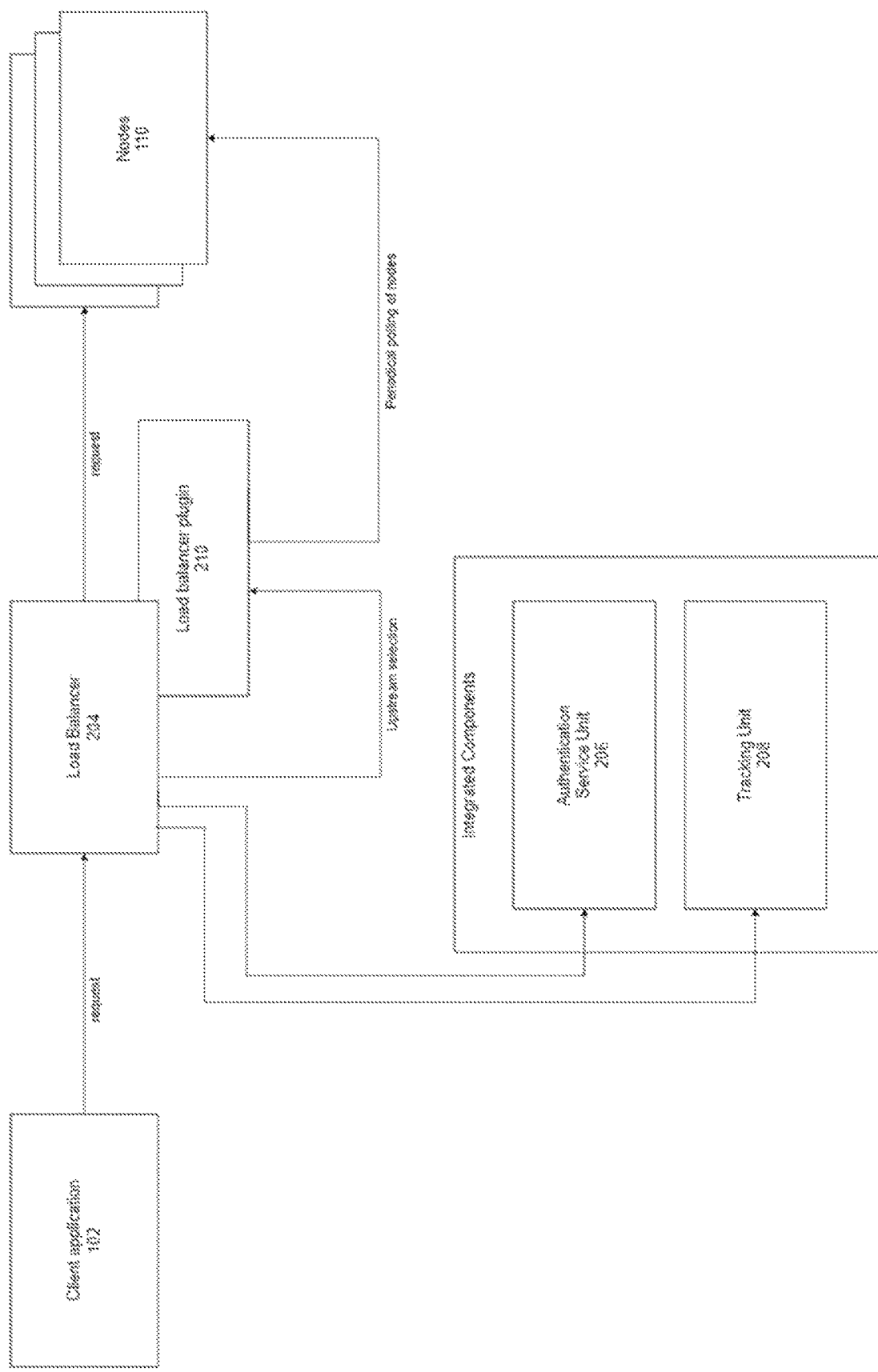
FIG. 3 illustrates a system for orchestrating requests to a set of blockchain nodes, in accordance with the embodiment.

FIG. 3 illustrates system 200 for orchestrating requests to a set of blockchain nodes 110, according to one embodiment. As described with reference to FIG. 1 and FIG. 2 earlier, the user is enabled to make a request using a client application 102, which is routed to the blockchain nodes 110 through a load balancer 204, for reliable, stable, and accurate data orchestration.

According to the embodiment, the load balancer 204 is communicatively coupled to at least one client application 102 to receive the request made by the user, as described with reference to FIG. 2. In one implementation, the load balancer 204 may be installed as a standalone gateway component. In one example, the load balancer 204 may be a Layer 7 (L7) load balancer 204. A much wider range of data can be evaluated by the L7 load balancer 204 including the HTTP headers and SSL sessions and distributes the requests based on the decision arising from a combination of several parameters. L7 load balancers 204 are configured to take routing decisions based on IPs, TCP or UDP ports or any information it can get from the application protocol, such as HTTP. The L7 load-balancer acts as a proxy, which means it maintains two TCP connections, one with the client and one with the server.

To facilitate and maintain the packet flows between the clients and the servers. embodiments of the distributed load balancer 204 may employ various techniques or technologies including but not limited to multipath routing technology, consistent hashing technology, and health checking.

Selecting a blockchain node 110 for serving the request contributes to the efficiency of the load balancing functionality. The conventional load balancer 204 layer may randomly select a destination node 110 and forward the connection request to the selected destination node 110. In one implementation, load balancers 204 may be configured with a selection logic or selection algorithm. For example, conventional load balancers 204, for selecting a blockchain node 110 purpose, typically use techniques or algorithms such as max connections. round robin, or least connections techniques to select which blockchain node 110 should handle the proxy request.

In a distributed system 200, some requests can be served only by some of the nodes 110 based on the application-specific details. In accordance with one embodiment, the load balancer 204 may be configured with an upstream selection logic. An upstream selection logic is a logic which is implemented on the load balancer 204 to identify an optimal blockchain node 110 to serve the request. Currently available and widely used load balancers 204, such as Envoy, Nginx, HAProxy and the like, can be configured with custom logic, business rules. function, or operations for executing one or more protocols related to the blockchain network.

According to one embodiment, the upstream selection logic may be based on a priority metric formed with one or more node identification parameters. The upstream selection logic may depend on a plurality of the parameters, and data specific to these parameters corresponding to each node may be collected as the upstream custom metadata. This metadata, described in detail in subsequent paragraphs of the present disclosure, is utilized to analyze priority metric. In an implementation, a node 110 having the highest priority metric may be selected to handle the request. To determine the highest priority, one or more node identification parameters may be monitored and evaluated. The one or more node identification parameters comprise highest block hash values (the blockchain node associated with a lowest or highest block hash value may be selected), certain thresholds (such as hardware utilization thresholds or software utilization thresholds that disqualify a blockchain node 110 from handling a request, for example, a CPU utilization exceeding 75% may be a configurable threshold that disqualifies any node that executes the request), current load status (any node experiencing with heavy load will be deemed as a low priority), upstream information regarding network accessibility, and so on.

In one embodiment, collecting data from upstream may be associated with a polling interval parameter. The polling interval parameter may be configured on the load balancer 204 plugin level and set in seconds. The polling interval parameters are configured for each node 110.

In some embodiments, along with the identification parameters, the health status of the nodes is also monitored by the load balancer 204, according to a predefined health check interval. At each interval, for example every 1 second, the load balancer 204 may health check at least one blockchain node 110. The load balancer 204 may update its locally stored health information, corresponding to at least one blockchain node 110, according to the health checks. On one implementation, the load balancer 204 may maintain a list of healthy blockchain nodes 110. In one implementation, blockchain nodes 110 may get selected randomly for the health check. In another implementation, the blockchain nodes 110 may get selected in a predefined pattern for the health check.

In one embodiment, if one or more nodes 110 matches the upstream selection criteria, the system 200 may select a node 110, out of the one or more nodes 110 matching the criteria, based upon the conventional node selection algorithms, such as round robin algorithm.

The load balancer 204, according to one embodiment, is provided with custom metadata specific to a blockchain protocol for orchestrating the request within the blockchain network. According to some embodiment, the load balancer 204 may be provided with a variety of metadata. The metadata is data that provides information about stored data. In one example. the metadata may be a reference to a previous block hash, which connects the current block to the previous block, lying in the blockchain, reference to the previous synchronized block, and the like. In another example, metadata relates to timestamps related to block activities. In yet another example, metadata relates to a data structure used to summarize all the transactions in the block in an efficient manner. In some embodiments, the metadata can be block related authentication and authorization attributes, geographic requirements, national or regional boundary attributes, delivery options and features, security attributes, and access controls such as type of data or rate of request limits, and the like.

As mentioned earlier, the load balancer 204 can be implemented on a service mesh infrastructure layer. In the service mesh implementation, the load balancer 204 is implemented on an infrastructure layer for routing requests to one or more blockchain nodes 110 within the blockchain network. The service mesh is typically employed to achieve load balancing, traffic management, and the like, which may be integrated within a computing environment. The service mesh utilizes application programming interfaces (APIs) which do not need hardware appliances for their implementation. In some examples, the service mesh may deliver a pervasive layer of services across all environments that containerized applications and microservices can be connected to.

The load balancer 204 collects metadata defining one or more identifying parameters, and upstream logic utilizes the metadata to identify the node 110 which can handle the request. Monitoring of the current status and metadata of each blockchain node 110 allows the system 200 to select a node 110 and manage data orchestration between the client application 102 and the node 110 without compromising reliability, stability, and data accuracy.

According to some embodiments, a load balancer plugin 210 can be implemented on the load balancer 204 to apply custom upstream selection logic. In an implementation, the load balancer plugin 210 may be configured with parameters specific to an environment on which the system 200 is implemented. The parameters, acceptable range of parameters value, logics of parameters (true and false), predefined values of the parameters, predefined response time. and such aspects can be provided to the load balancer plugin 210. These aspects can be filtered during the upstream selection process. In one implementation, the parameter configuration can be updated or modified as per the requirements.

In some embodiments, if any blockchain node 110 fails to handle the request, the load balancer 204 is configured for retrying the assigned task for a predefined number of times. If the request is not responded to for a predefined number of times, the load balancer 204 may include an alerting system which may be configured to alert or send error messages to the client in case of failure of handling the request.

According to an embodiment, the system 200 further includes an authentication service unit 206. The function of the Authentication Service is to request information from an authenticating party and validate it against the configured identity repository using the specified authentication module. After successful authentication, the user session is activated and can be validated across all web applications participating in the network. In accordance with one implementation, the authentication service unit 206 is implemented on the system or is integrated with the load balancer 204 for authenticating the request.

Further, the load balancer 204 is integrated with a tracking unit 208, for tracking the request, according to one implementation.

Blockchain-specific load balancers are designed to solve problems of reliability, stability, and data orchestration accuracy, but they impose additional infrastructure and operational cost and difficulties on system 200, as well as security risks. In an embodiment. blockchain-specific load balancers are not used and, general-purpose load balancer 204 configured with the upstream selection logic and provided with the custom metadata related to the blockchain protocol allows the load balancer 204 to select the nodes 110 without any drawn effect from the distributed ledger network.

Figure 4:
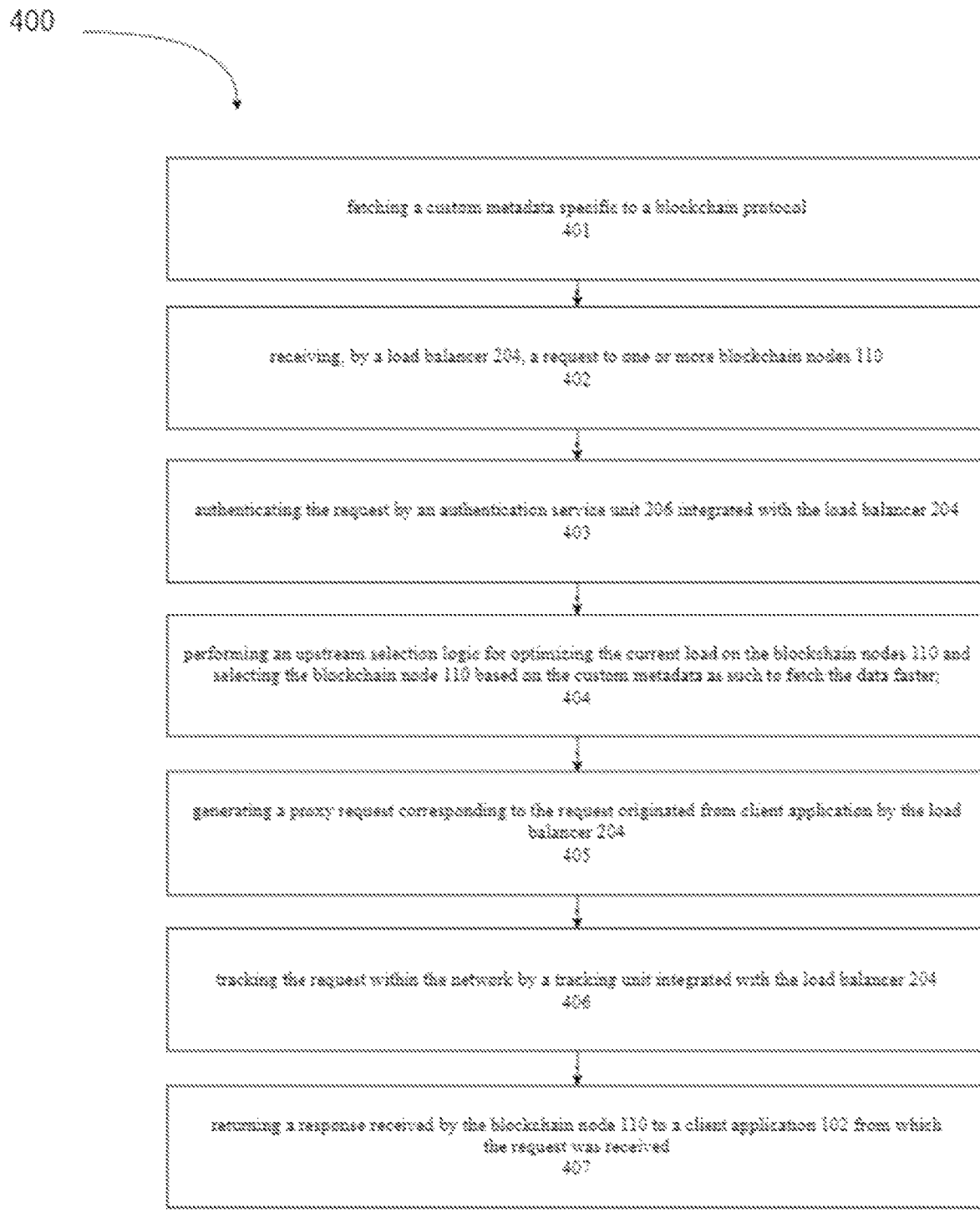
FIG. 4 describes a method block diagram for orchestrating requests to a set of blockchain nodes, in accordance with the embodiment.

FIG. 4 describes a method of request-handling flow in accordance with an embodiment of the invention. The method steps enable the system 200 that comprises the load balancer 204 configured to receive metadata specific to one or more blockchain nodes 110 and perform selection logic to select a blockchain node 110 to handle the request. The load balancer 204 generates a proxy request and orchestrates the proxy request on the selected blockchain node 110.

At block 402, a request for accessing data from at least one blockchain node is received by the load balancer 204 from the client application 102. The client applications 102 may be referred to as user devices communicating through the client applications 202.

At block 403, the request is authenticated by the authentication service unit 206 integrated with the load balancer 204. In an example, the authentication service unit 206 may be an integrated plugin applied to the load balancer 204.

At block 404, the blockchain node 110 is selected according to an upstream selection logic.

At block 405, a proxy request, corresponding to the request received by the load balancer 204, is generated by the loader balancer 204. A load balancer 204 acts as a proxy to the blockchain node 110 while serving the request.

At block 406, the request is tracked within the network by the tracking unit 208 integrated with the load balancer 204.

At block 407, a response to the request generated by the blockchain node 110 is returned, by the load balancer 204, to the client application 102 from which the request was received.

The invention claimed is:

1. A system for orchestrating requests to a set of blockchain nodes, comprising:
   a processor coupled to a memory;
   at least one client application configured for generating a request to one or more blockchain nodes;
   a load balancer communicatively coupled to the at least one client application configured for receiving the request and generating a proxy request corresponding to the request, wherein the load balancer is configured with:
      a load balancer plugin that polls custom metadata specific to a blockchain protocol for orchestrating the request within the set of blockchain nodes connected to the same blockchain network, and
      an upstream selection logic implemented on the load balancer to identify an optimal blockchain node to serve the request based on the polled specific custom metadata;
   an authentication service unit, integrated with the load balancer, configured to authenticate the request; and
   a tracking unit, integrated with the load balancer, configured for tracking the request.

2. The system of claim 1, wherein the load balancer is configured to return a response received from the identified optimal blockchain node to a client service from which the request was received.

3. The system of claim 1, wherein the load balancer is implemented on an infrastructure layer for routing the proxy request to the one or more blockchain nodes connected to the same blockchain network.

4. The system of claim 3, wherein the infrastructure layer is one of standalone gateway or a service mesh infrastructure.

5. The system of claim 1, wherein the request is proxied based on the upstream selection logic, and wherein the upstream selection logic is based on at least one parameter of node location, state, current block height, synchronization status, node mode, or number of peers.

6. The system of claim 5, wherein a periodical poll is conducted on each blockchain node of the set of blockchain nodes at each load balancing instance, and during the periodical polling, each load balancing instance, monitors current status of each blockchain node.

7. The system of claim 5, wherein if upstream selection criterion is met by more than one blockchain node, conventional selection logic is applied to select a blockchain node to handle the request.

8. The system of claim 1, wherein the load balancer is further configured to retry the execution of failed requests, and if the request cannot be executed after trying for a predetermined number of times, the load balancer generates an alert or error message to be returned to the client application.

9. The system of claim 1, wherein the load balancer is a general-purpose load balancer.

10. A method for orchestrating requests to a set of blockchain nodes comprising:
    fetching a custom metadata specific to a blockchain protocol;
    receiving, by a load balancer, a request to one or more blockchain nodes;
    authenticating the request by an authentication service unit integrated with the load balancer;
    performing an upstream selection logic for optimizing a current load on the set of blockchain nodes and selecting the one or more blockchain nodes based on the fetched custom metadata as such to fetch data faster;
    generating a proxy request corresponding to the request originated from a client application by the load balancer;
    tracking the request within a network by a tracking unit integrated with the load balancer; and
    returning a response received by the blockchain node to the client application from which the request was received.

* * * * *